United States Patent
Poehlmann et al.

(10) Patent No.: US 8,573,703 B2
(45) Date of Patent: Nov. 5, 2013

(54) HEADREST FOR MOTOR-VEHICLE SEAT

(75) Inventors: Christian Poehlmann, Amberg (DE); Manfred Schlierf, Amberg (DE); Joerg Girbinger, Amberg (DE); Maximilian Kotz, Rieden (DE)

(73) Assignee: Grammer AG, Amberg (DE)

(*) Notice: Subject to any disclaimer, the term of this patent is extended or adjusted under 35 U.S.C. 154(b) by 0 days.

(21) Appl. No.: 13/111,342

(22) Filed: May 19, 2011

(65) Prior Publication Data
US 2011/0291456 A1 Dec. 1, 2011

(30) Foreign Application Priority Data
May 31, 2010 (DE) .................. 10 2010 022 293

(51) Int. Cl.
*A47C 7/36* (2006.01)

(52) U.S. Cl.
USPC ........................................ 297/410

(58) Field of Classification Search
USPC .................................. 297/391, 410
See application file for complete search history.

(56) References Cited

U.S. PATENT DOCUMENTS

| 3,563,602 | A | * | 2/1971 | Ohta et al. ................... 297/410 |
| 6,068,337 | A | | 5/2000 | DeFilippo |
| 7,137,668 | B2 | * | 11/2006 | Kreitler ......................... 297/410 |
| 7,306,287 | B2 | * | 12/2007 | Linardi et al. ................ 297/410 |
| 7,316,455 | B2 | | 1/2008 | Metz |
| 7,562,936 | B1 | * | 7/2009 | Veine et al. ................... 297/410 |
| 8,297,705 | B2 | * | 10/2012 | Brunner et al. ............... 297/410 |
| 8,303,039 | B2 | * | 11/2012 | Mueller et al. ............... 297/410 |
| 2011/0006578 | A1 | * | 1/2011 | Veine et al. ................... 297/410 |

FOREIGN PATENT DOCUMENTS

DE 19630473 A 1/1996

* cited by examiner

*Primary Examiner* — Milton Nelson, Jr.
(74) *Attorney, Agent, or Firm* — Andrew Wilford (57) ABSTRACT

A headrest has a generally vertical rod mountable in a motor-vehicle seat and formed with a plurality of vertically spaced and horizontally open notches, a support vertically movable along the rod and adapted to carry a head cushion, and a latch element vertically fixed on the support and shiftable on the support between a latched position engaged in one of the notches and locking the support on the rod against downward movement and an unlatched position disengaged from the rod and permitting free vertical movement of the support on the rod. An actuating element is pivotal about an axis on the support between an actuated position holding the latch element in the disengaged position and a rest position with the latch element in the engaged position.

13 Claims, 13 Drawing Sheets

HEADREST FOR MOTOR-VEHICLE SEAT

FIELD OF THE INVENTION

The present invention relates to a headrest. More particularly this invention concerns a vertically adjustable headrest for a motor-vehicle seat.

BACKGROUND OF THE INVENTION

A headrest is known from U.S. Pat. No. 6,068,337, in which a head support is vertically adjustable relative to support rods normally fixed in a seat back of a motor-vehicle seat. The head support can be locked in different positions by a latch. A slide block is shiftable between two positions on the head support. Two springs are attached to the slide block with one spring leg firmly fixed to the slide block and oriented such that it can be brought into engagement with a locking notch of the support rod. A second spring leg is supported on the head support. In this manner the first spring leg is biased into engagement with the locking notch. The slide block can be moved by a control part in a straight line into a release position in which the first spring leg of both springs is not in engagement with the locking notch.

In the case of the headrest according to DE 20 2005 016 130, a head support is moveably supported relative to support rods. The head support can be locked in different height positions by a latch. Locking pins are supported on the headrest part such that they can be brought into engagement with locking notches of the support rods. The locking pins are attached to rods and both sets of rods are moveably connected by a two-armed lever. In order to move the latch into the unlatched position, the rods of a first locking pin can be displaced in a straight line by a push button, wherein the rods of the second locking pin are displaced by the two-armed lever in the opposite direction in order to release the locking pins from locking notches located on the insides of the support rods.

The latching of the vertically adjustable head support is also done according to DE 196 30 473 by two springs, one spring leg being held firmly at the head support and a further leg of the spring engageable with a locking notch of the support rod. A tie rod is attached to a handle. The tie rod is held on the free spring leg by another end. By actuation of the handle, the free length of the tie rod is shortened, and the free legs of the springs are moved out of engagement with the locking notch. The handle can be moveable in a straight line or supported in a rotatable manner.

According to an alternative embodiment of the subject matter of DE 196 30 473 A1, the latch spring is formed by a bar spring whose free ends interact with the locking notches of the support rods. The handle interacts with a central region of the bar spring, in that, with an actuation of the handle, the bar spring is bent such that the free ends move out of the locking notches of the support rods.

OBJECTS OF THE INVENTION

It is therefore an object of the present invention to provide an improved headrest for a motor-vehicle seat.

Another object is the provision of such an improved headrest that overcomes the above-given disadvantages, in particular that can be manufactured in a cost-effective manner.

Another object is to provide the headrest with an adjuster that takes up little installation space.

SUMMARY OF THE INVENTION

A headrest has according to the invention a generally vertical rod mountable in a motor-vehicle seat and formed with a plurality of vertically spaced and horizontally open notches, a support vertically movable along the rod and adapted to carry a head cushion, and a latch element vertically fixed on the support and shiftable on the support between a latched position engaged in one of the notches and locking the support on the rod against downward movement and an unlatched position disengaged from the rod and permitting free vertical movement of the support on the rod. An actuating element is pivotal about an axis on the support between an actuated position holding the latch element in the disengaged position and a rest position with the latch element in the engaged position.

According to the invention the support rod is formed with notches, and one part of the latch element can be brought into engagement with one of the notches to lock the head support at a specific height. The latch element can be formed by a spring, for example. According to an alternative, the latch element can be formed by a rigid member urged by a return force. The spring or the latch can be loaded, for example by the return force, into engagement with a notch of the support rod.

In the case of two support rods, respective latch elements can be provided to latch the head support. According to an alternative embodiment, a latch element can be provided which interacts with both of the support rods. For example, a spring can have two free ends, and a first end of the spring interacts with locking notches of a first support rod and a second end interacts with locking notches of a second support rod.

The notches of the support rod can be arranged, for example on a front of the support rod pointing in the direction of travel or on a rear of the support rod pointing in the direction of the rear of the vehicle. For the purposes of the invention, the term notch covers all forms of recesses of the support rod, including full perimeter or partial perimeter recesses of the support rod.

The latch has a latched position and an unlatched position. In the latched position, at least one region of the latch element, in particular one region of the spring, is in engagement with a locking notch, so that vertical movement of the head support is not possible in at least one direction, normally downward. In the latched position, the latch element can also be in an engagement advanced position from which it can be moved by a slight adjustment in height of the head support automatically into engagement with a locking notch. The latter is the case when the latch is set in the latched position and the latch element cannot move into engagement with a locking notch, since it is positioned between two locking notches. In this case, movement of the head support is necessary until the latch element is snapped by the elastic return force into the locking notch. In the unlatched position, the latch element or at least one region of the latch element is disengaged from the notch, so that the head support is height adjustable.

If separate latch elements or separate regions of a latch element interact with notches of two separate support rods, the latch elements or the regions are moved in the same first direction in engagement or in the same second direction out of engagement with the notch. For the purposes of the invention, the first direction as well as the second direction can be a straight-line or an arcuate movement or also a combination of different movements.

The notches in the support rod can be embodied, for example such that in the latched position of the latch movement of the head support is prevented in a first direction and is possible in a second direction. For example, in the latched position, a movement of the head support can be prevented in the insert direction (downward) and a movement can be possible in the withdrawal position (upward). According to an alternative, in the latched position, a movement of the head support is prevented in the first direction as well as in the second direction.

The latch is biased by the return force of at least one reset element in the latched position.

The latch comprises an actuator with a pivotal actuating element, for example in an actuated position when the latch is located in the unlatched position and is in a rest position when the latch is in the latched position. The actuating element interacts with the latch element such that movement of the actuating element between the actuated position and the rest position moves the latch element, in particular the spring or at least a region of the spring, between an disengaged (unlatched) position and an engaged (latched) position. In the engaged position, the latch element is engaged with the notch or with a movement of the head support is moved into a notch. In the disengaged position, the latch element is not engaged with the notch.

For example, the latch element can be moved out of the engaged position into the disengaged position by movement of the actuating element from the rest position into the actuated position.

As soon as the actuating element is no longer held in the actuated position, the latch element is moved back into the engaged position by the elastic return force. The latch element and for example also the actuating element thus move into the rest position from the actuated position. At the same time, further elements of the actuator can be moved back into the starting position.

The actuator of the headrest according to the invention takes up little installation space, so that the headrest can also be made very compact. Furthermore, adjustment is possible with low actuating forces.

One embodiment is characterized in that the actuating element is a lever. For example, the actuating element can be a one-armed lever or a two-armed lever. A first lever arm of the lever engages the latch element, for example, in order to move the latch element into engagement with the support rod notch or out of engagement with the support rod latch. The lever arm can be, for example in indirect or direct contact with the latch element. A second lever arm interacts with a control device that can be operated by the user. With the use of a multiple-arm lever, it is possible to actuate the latch with low force, even with high holding forces, by appropriate dimensions of the lever arms.

A further embodiment of the invention is characterized in that the actuator comprises a control device that moves the actuating element between the actuated position and the rest position. The control device can comprise, for example an operating element, such as for example a push button that can be operated from outside. The operating element can be outside the head support. Furthermore, the control device can comprise a control element that interacts with the actuating element.

The latch element and the control device are formed by separate parts that are operatively connected, for example moveably connected, to one another only by the actuating element. The latch element and the control device are formed by separately supported parts.

One embodiment of the invention is characterized in that the control device has a slide moveable in a straight line or pivotally about an axis. The slide or the pivotal part form the control element of the control device. For example, the slide can interact with the actuating element such that a pivotal motion of the actuating element is caused by the movement of the slide. According to an alternative, for example at least one actuating element can be mounted on an axle. The actuating element can then be pivoted by a rotary motion of the axle. The slide can be moveable relative to an axis that is parallel to the pivot axis of the actuating element.

A further embodiment is characterized in that the actuator comprises a motion converter that converts a linear movement into a rotary movement. For example, the operating element can be moveable in a linear manner and the control element can be rotatable about a rotation axis. In this case, the motion converted is provided to convert the movement of the operating element into a pivotal movement. According to an alternative, for example the operating element and the control element can be moved in straight line, in particular in the same direction. The motion converter in this case is provided to convert the linear movement of the control element into a pivotal motion of the actuating element. Several motion converters can be provided. For example, a first motion converter can be between the control element and a first actuating element, and a second motion converter can be between the control element and the second actuating element.

Another embodiment is characterized in that the actuating element, in particular in the rest position, has at least one surface that forms an angle with a plane extending between the two support rods in order to convert a pivotal motion of the actuating element into a movement of the spring out of engagement with the locking notch. Movement of the actuating element from the rest position into the actuated position brings the surface into contact with the spring. This then leads to the end of the spring being moved out of engagement with the locking notch.

In order to limit the degree of freedom of the latch element, guide surfaces can be provided on the head support. In this manner the latch element can be guided, for example such that it moves in a certain direction out of engagement and into engagement with the locking notch.

Another embodiment of the invention is characterized in that the latch comprises at least two actuating elements, namely a first actuating element interacting with a first latch region and a second actuating element interacting with a second latch region. The first latch region and the second latch region can be assigned to a latch element, in particular a spring, or according to an alternative two different latch elements, in particular two separate springs. For example, the latch can comprise a spring element with a first spring region interacting with locking notches of a first support rod and a second spring region interacting with locking notches of a second support rod of the headrest. Alternatively, for example, a first spring can interact with the locking notches of a first support rod and a second spring can interact with the locking notches of a second support rod.

Another embodiment is characterized in that the actuator comprises a coupling by means of which the actuating elements are moveable at the same time with the actuation of the actuator. The coupling can be formed by a push rod. The push rod can be pivoted on both actuating elements. Alternatively, the coupling can be formed by a pivot axle carrying both actuating elements.

Another embodiment is characterized in that the headrest comprises two support rods and that a first region of the latch element, in particular a spring, interacts with a first support rod, and a second region of the latch element interacts with a second support rod.

According to a further embodiment of the invention, one latch element, for example a spring, interacts with a support rod.

Another embodiment is characterized in that the latch element is a spring, in particular a bar or wire spring. The spring has a bearing region attached to the head support. A bar spring, for example, can be provided, which interacts with the locking notches of a first as well as a second support rod. For example, a central region of the bar spring can be supported on the head support. At least one region of the bar spring interacts with a locking notch. A first free end of the bar spring can be brought into engagement with the locking notches of a first support rod, and a second free end of the bar spring can be brought into engagement with the locking notches of a second support rod. Alternatively, a separate bar spring can be provided for each support rod, with one region of each bar spring engageable with one of the locking notches of the respective support rod.

According to an alternative, the latch element, for example instead of a bar spring can also be formed by any other conceivable spring, such as, for example a hairpin spring or a bracket spring. For example, at least one end or also at least one central region of the spring can interact with the locking notches of at least one support rod.

Another embodiment is characterized in that the actuating element interacts with a free end of the spring. The actuation by the actuating element can take place, for example between a bearing region of the spring and at least one latch region that interacts with the locking notches. According to an alternative, the latch region is between the bearing region and the free end at which the actuation by the actuating element takes place. According to a further alternative, the actuating element can also interact with a central region of the spring. For example, both ends of the spring can have bearing regions, and the actuation by the actuating element takes place between the bearing regions.

A further embodiment is characterized in that two seats or bearings spaced apart from one another are provided and that the actuating element interacts with a central region of the spring embodied between the counter bearings. In this manner, for example free ends of the spring can be moveable out of engagement or into engagement with the locking notches. In this case, it is possible for the actuator to comprise only one actuating element.

A further embodiment of the invention is characterized in that the latch is loaded by the return force of at least one reset element into the latched position. For example, the latch can be moveable by an actuation of the operating element into the unlatched position and by the return force of the reset element back into the latched position when the operating element is no longer actuated. The reset element can be formed by the spring that interacts with the support rod. Alternatively or additionally, a separate reset element, for example a separate spring, can be provided.

BRIEF DESCRIPTION OF THE DRAWING

The above and other objects, features, and advantages will become more readily apparent from the following description, reference being made to the accompanying drawing in which.

DETAILED DESCRIPTION

Figure 4:
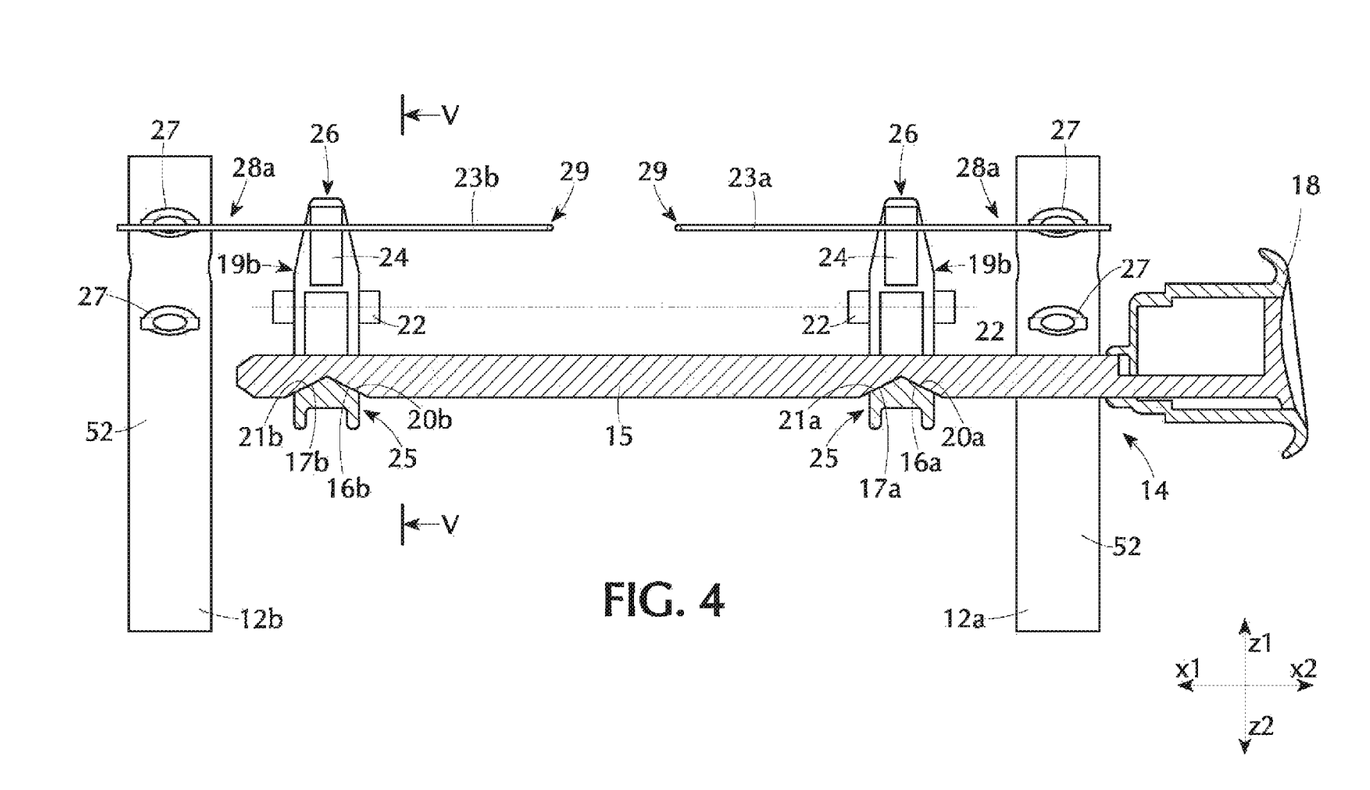
FIG. 4 is a partially sectional diagrammatic front view of the latch in the latched position.
Figure 5:
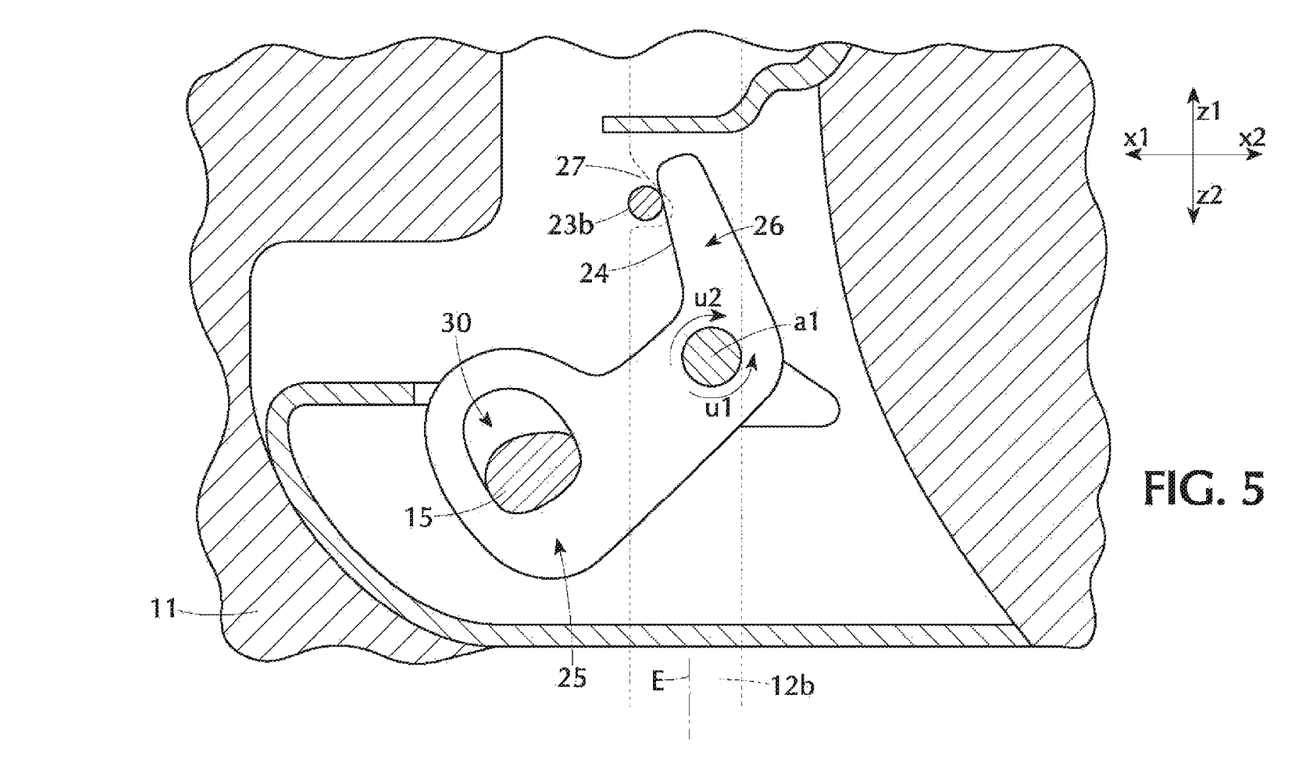
FIG. 5 is a sectional view taken along line V-V of FIG. 4 with the latch in the latched position.
Figure 6:
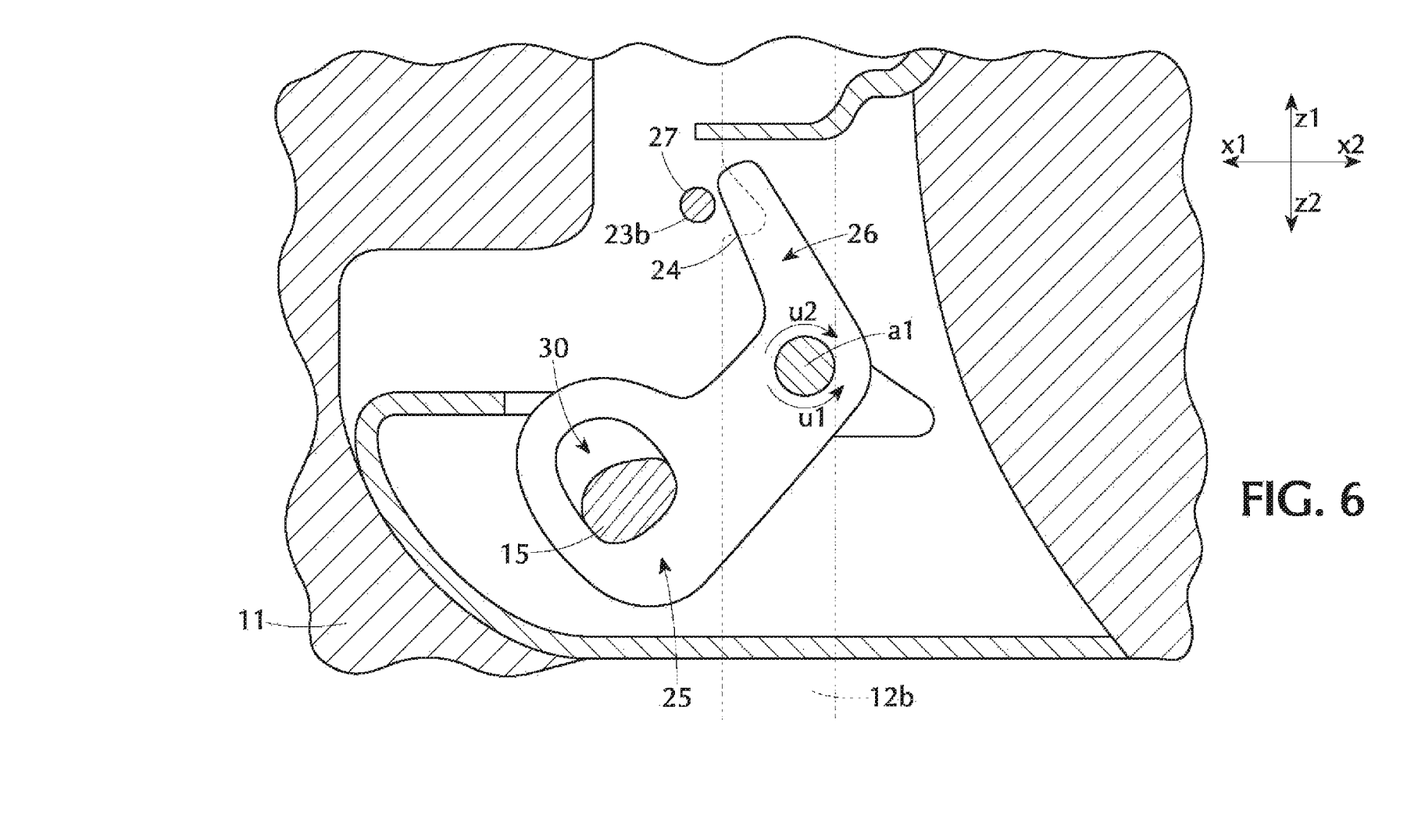
FIG. 6 is a view like FIG. 5 but with the latch in the unlatched position.

As shown in FIGS. 1-6, a motor-vehicle headrest 10 has a head support 11 normally carrying a cushion shown schematically at C and attached to upper ends of support rods 12a and 12b fixed in a back of a motor-vehicle seat shown schematically at S. Upper ends 34a and 34b of the support rods 12a and 12b fit slidably into seats 35a and 35b in the head support 11. As a result, the head support 11 can be moved relative to the support rods 12a and 12b upward and downward in directions z1 and z2 when a latch 13 is in the unlatched position (FIG. 6). If the latch 13 is in a latched position (FIG. 5), movement of the head support 11 in the downward direction z2 relative to the support rods 12a and 12b is not possible. According to an alternative unillustrated embodiment, in the latched position movement in the is upward direction z1 as well as movement in the downward direction z2 can be prevented in the below-described latched position.

Figure 1:
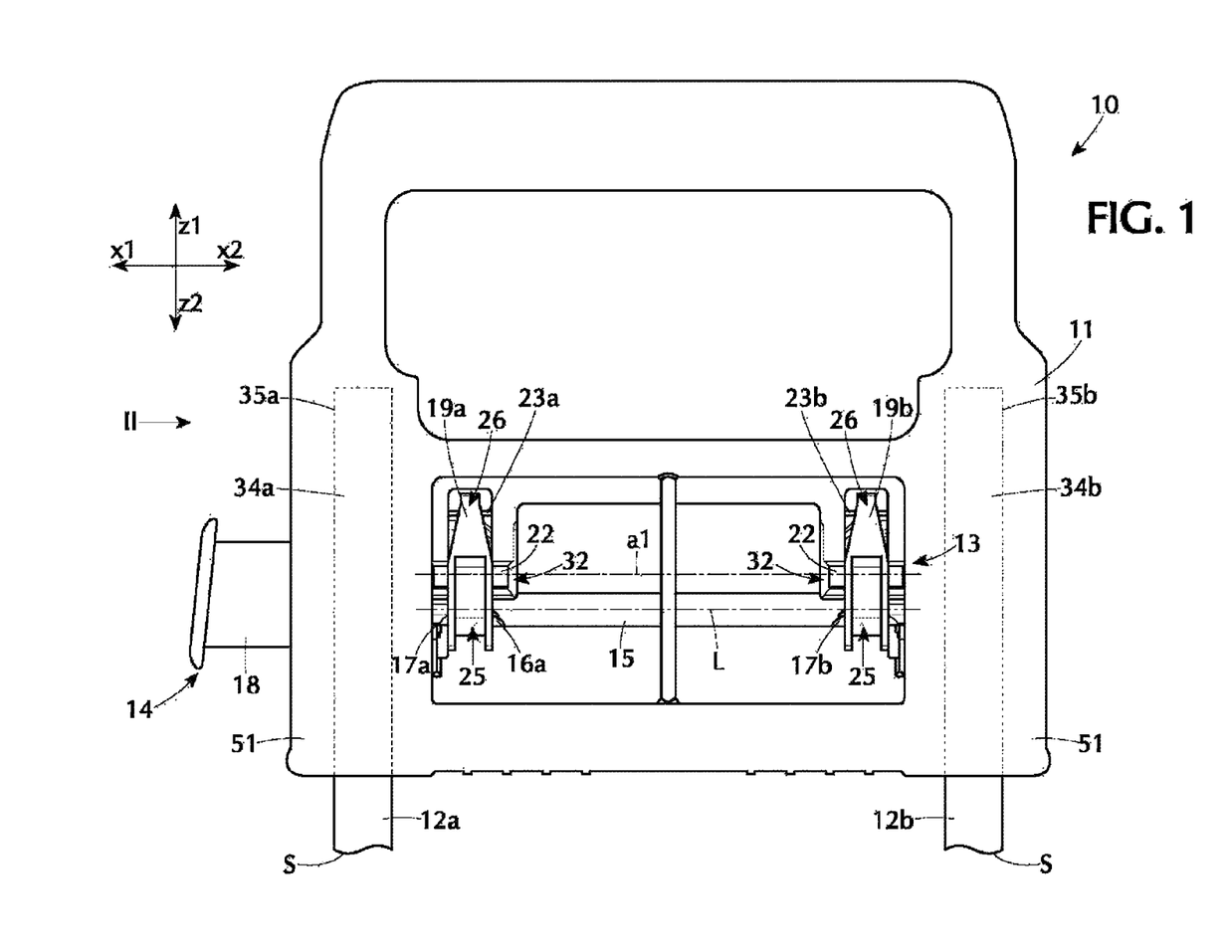
FIG. 1 is a diagrammatic rear view of a first embodiment of the headrest, the head cushion not being shown.
Figure 2:
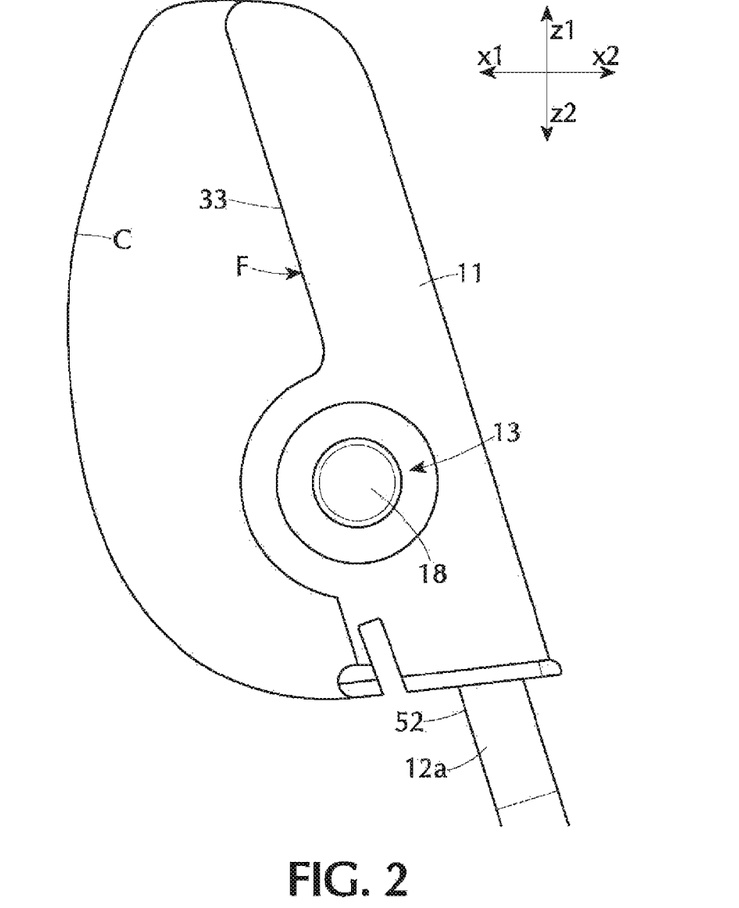
FIG. 2 is a diagrammatic view taken in the direction of arrow II of FIG. 1 with the head cushion shown schematically.

FIG. 2 shows how the head support 11 forms a support surface 33 that is forwardly engageable through the head cushion C with the head of an occupant of the seat S on which the headrest 10 is mounted. The surface 33 is acted on by a force F in a horizontally rearward direction x2 opposite to a horizontal forward travel direction x1 when, during sudden acceleration for instance from a rear-end collision, the seat occupant's head moves suddenly rearward.

The latch 13 is spring-loaded into a latched position shown in FIG. 5. An operating element 18 of an actuator 14 can shift the latch 13 between the latched position (FIG. 5) and the unlatched position (FIG. 6) by moving the operating element 18 in direction y1 that is horizontal and perpendicular to the directions x1 and x2. If the control element 18 is not actuated, the latch 13 automatically moves into the latched position and the operating element 18 moves back in a direction y2 opposite the direction y1 into the starting (latched) position. Because the operating element 18 has to be moved transversely of the vehicle travel direction, sudden acceleration or deceleration of the vehicle will not actuate it and allow the headrest to move.

Figure 3:
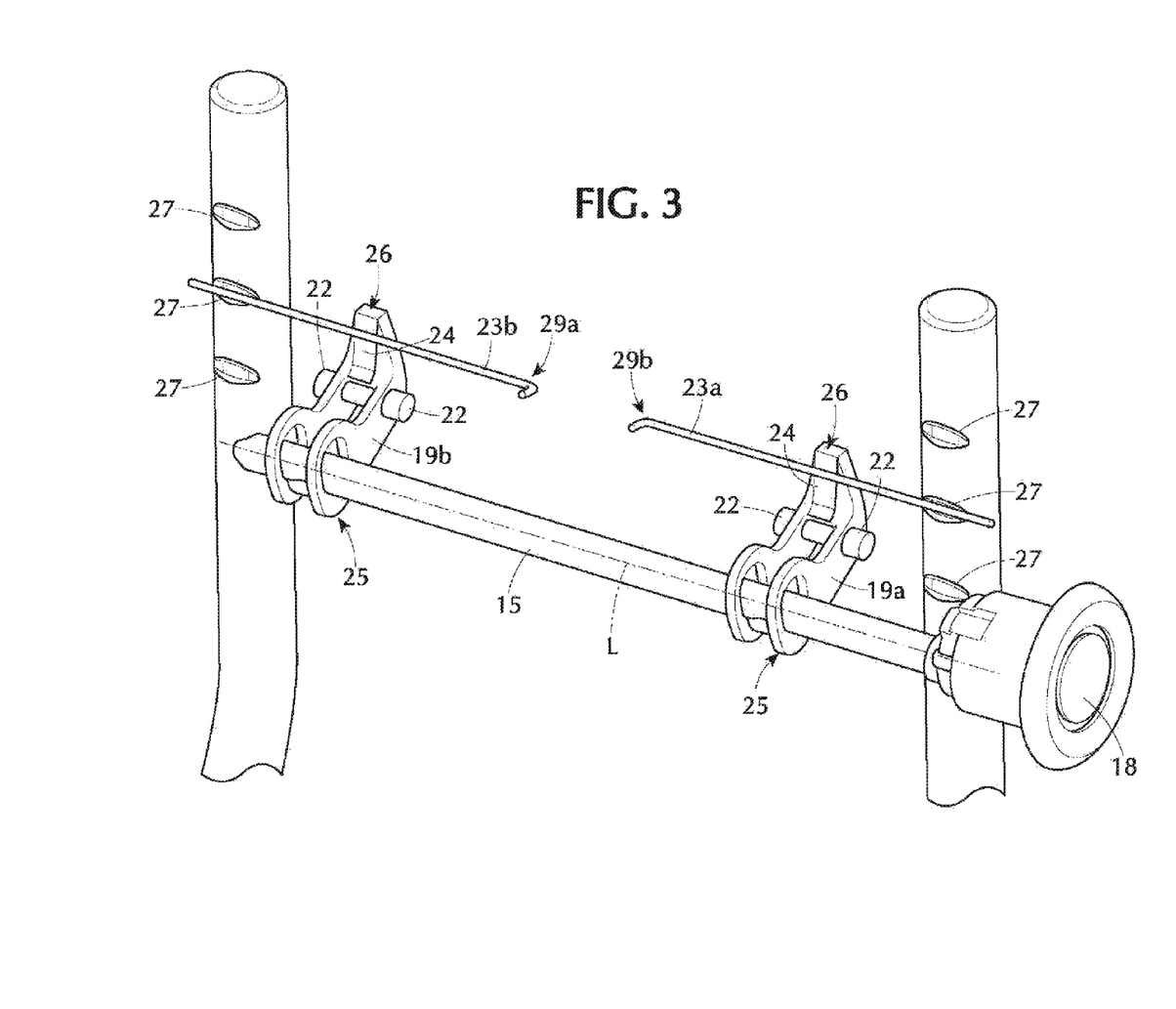
FIG. 3 is a diagrammatic perspective view of the latch of the headrest, the head support not being shown.

A slide 15 is connected for joint movement with the operating element 18 (see FIGS. 3 and 4). In this embodiment, the slide 15 is a push rod whose longitudinal axis L is essentially parallel to the directions y1 and y2. Shifting the operating element 18 in the direction y1 moves the slide 15 along its longitudinal axis L and in the direction y1.

The slide 15 interacts with actuating elements 19a and 19b and with them forms a motion converter. The actuating elements 19a and 19b are each provided on two sides with journal pins 22 supported in bearing seats 32 (FIG. 1) of the head support 11. In this manner the actuating elements 19a and 19b can each pivot about an axis a1 between an actuated position and a rest position. Each actuating element 19a and 19b is a two-arm lever with a first lever arm 25 and a second lever arm 26. The second lever arms 26 of the actuating elements 19a and 19b interact with respective spring 23a and 23b, as shown in more detail in FIG. 4. The springs 23a and 23b have respective inner-end fastening regions 29a and 29b seated in the support 11 and free outer ends 28a and 28b. The rods 12a and 12b are formed with forwardly open sawtooth notches 27 into which the outer ends 28a and 28b of the springs 23a and 23b can engage to prevent downward movement (direction z2) of the support 11.

According to FIG. 4, the first lever arm 25 of each of the elements 19a and 19b is provided with a throughgoing hole 30 through which the rod 15 passes and that is formed with respective pairs of angled faces 20a, 21a and 20b, 21b. The angled faces 20a and 20b are engageable with angled flanks 16a and 16b of respective notches of the slide 15, and the angled faces 21a and 21b are engageable with other angled flanks 17a and 17b of the notches of the slide 15.

Movement of the slide 15 in the direction y1 causes the faces 16a/20a and 16b/20b to engage each other and pivot the respective actuating elements 19a and 19b about the axis a1 out of the rest position shown in FIG. 5 in a direction u1 into an actuated position according to FIG. 6. In the same way, movement of the slide 15 from the latched position shown in FIG. 5 in the direction y2, due to the interacting oblique faces 17a/21a and 17b/21b, moves the actuating elements 19a and 19b out of the rest position shown in FIG. 5 about the pivot axis a1 in the direction u1 into the actuated position according to FIG. 6.

It is thus possible to actuate the latch 13 by movement of the operating element 18 in the direction y1 or in the direction y2 into the unlatched position. Furthermore, it is possible to use the same parts of the latch for different embodiments of the headrest, as in the first embodiment shown in FIG. 4, for example. In the embodiment according to FIG. 4 the control element 18 is on the left side of the headrest 10 relative to a person facing forward in the travel direction x1. It can also be on the right side of the headrest without any modification.

According to FIGS. 4, 5 and 6, a contact surface 24 of the second lever arm 26 of each of the actuating elements 19a and 19b on movement into the unlatched position moves the respective outer end 28a or 28b of the spring 23a or 23b in the direction x1 out of engagement with the respective locking notch 27. A plurality of locking notches 27 are formed on a front side 52, facing in the direction x1, of each support rod 12a and 12b. The contact surfaces 24 form an angle α1 with a plane E (FIG. 5) defined by the directions y1, y2 and z1, z2, which plane in the present embodiment is parallel to a vertical plane extending between the vertical axes of the support rods 12a and 12b, so that movement into the rest position exerts a force in the direction x1 on the springs 23a and 23b. When the latch 13 is in the unlatched position, the head support 11 can be moved in the direction z1 or z2.

After the head support 11 has been moved to the desired vertical position, the operating element 18 is released. The return force of the springs 23a and 23b moves them into the latched or engaged position and thereby causes the actuating elements 19a and 19b to pivot in the direction u2 by exerting a force on the surface 24 in the direction x2. The slide 15 and the operating element 18 are thereby moved back into the starting position by the interaction of the angled faces 20a and 16a as well as 20b and 16b in the direction y2.

Figure 7:
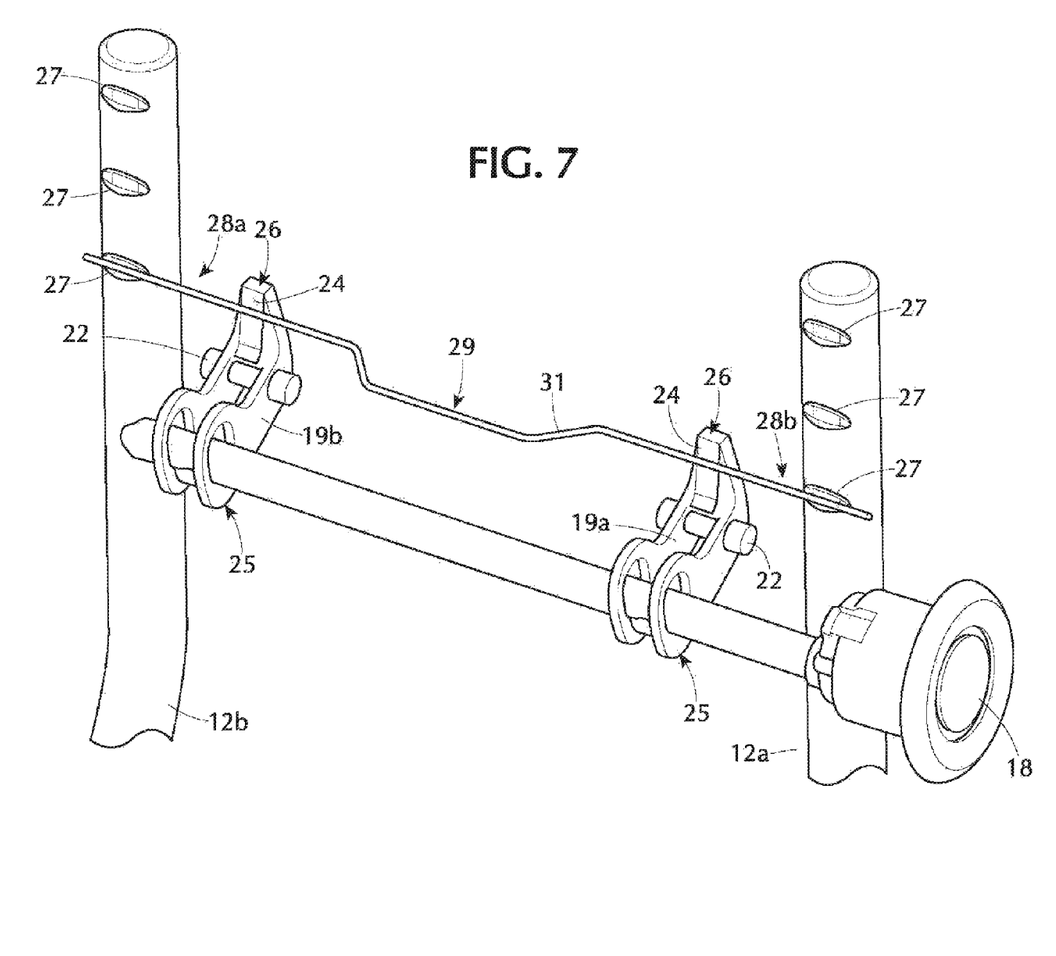
FIG. 7 is a diagrammatic perspective view of a second embodiment of the latch, the head support not being shown.

A second embodiment is shown in FIG. 7. It differs from the illustrated embodiments shown in FIGS. 1 through 6 only in that the headrest 10, instead of the springs 23a and 23b, has a one-piece spring 31 with free ends 28a and 28b extending unitarily from a central fastening region 29 fixed in the support 11. The end 28a can be brought detachably into engagement with support rod 12a and the end 28b can be brought detachably into engagement with the support rod 12b.

A third embodiment is shown in FIGS. 8 through 12. In this embodiment there is a head support or base 45 that is vertically shiftable along the support rods 12a and 12b via bearings 35a and 35b. The latch 13 here comprises actuating elements 19a and 19b that are pivotal on the base 45 about horizontal axes a2 and a3 that are parallel to each other and to the forward and rearward directions x1 and x2. According to an unillustrated alternative embodiment, the pivot axes a2 and a3, however, can also be at an angle to the horizontal.

The actuating elements 19a and 19b are linked together by a coupler rod 37 that is connected at a hinge 38a to the actuating element 19a and at a hinge 38b to the actuating element 19b. The hinges 38a and 38b are membrane hinges integrally formed with the rod 37 and elements 19a and 19b, so that the actuating elements 19a and 19b are unitarily formed with the coupler rod 37. The plastic forming these parts is so thin at the hinges 38a and 38b that it is flexible.

The actuating element 19a and 19b have respective cutouts 39a and 39b. Furthermore, actuating arms 40a and 40b formed on the elements 19a and 19b fit in cutouts or notches 51 (FIG. 9) of bearing parts 51 of the support 45. The actuating arm 40a is in contact with an the outer spring end 28a and the actuating arm 40b is in contact with the outer end 28b of a one-piece spring 41 centrally fixed in the support 45.

Figure 8:
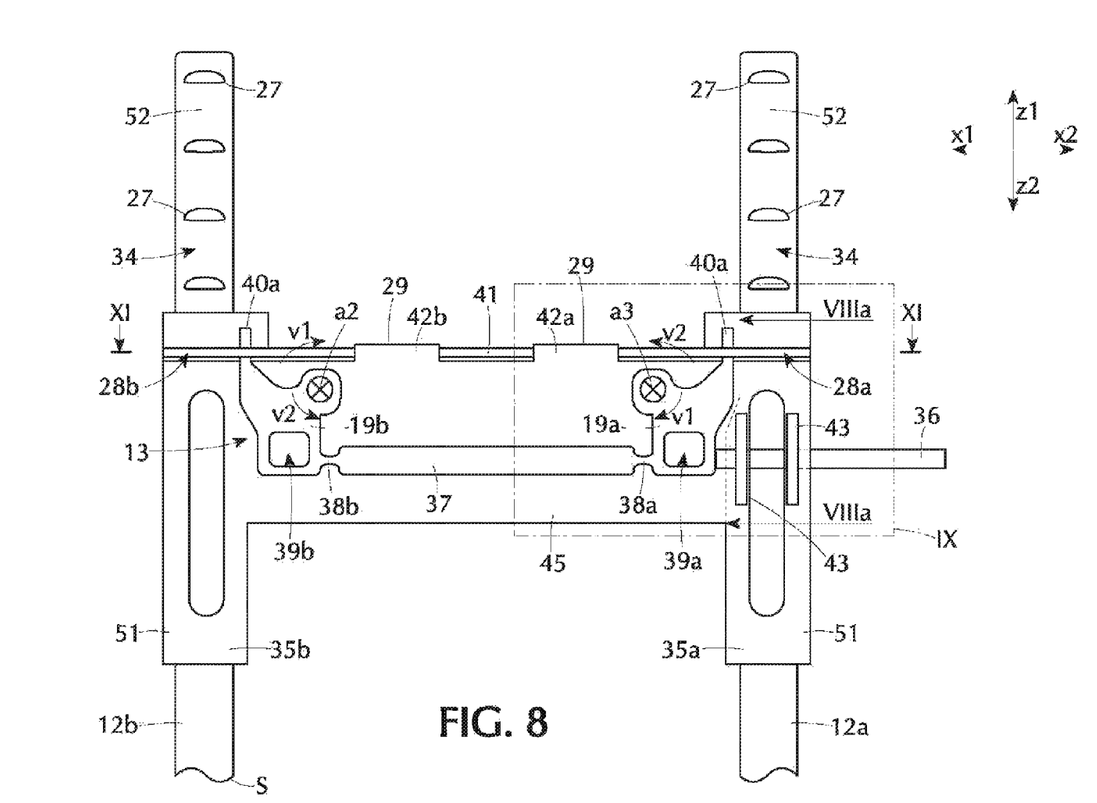
FIG. 8 is a diagrammatic front view of a third embodiment of the headrest in the latched position, the head support not being shown.

According to FIG. 8, the spring 41 is held in a central fastening region 29 in seats 42a and 42b firmly on the base part 45. Ends 28a and 28b of the spring 41 pass through cutouts 49a and 49b of the bearing parts 51 of the base part 45. Due to the cutouts 49a and 49b, the ends 28a and 28b can be brought into engagement or out of engagement with the notches 27 of the support rods 12a and 12b. The inner surfaces of the cutouts 49a and 49b form a guide for the ends 28a and 28b so that they can only move in the directions x1 and x2.

Movement of the latch 13 from the latched position (see FIGS. 8, 8a, 9 and 11) into the unlatched position (see FIGS. 10 and 12) is effected by an unillustrated operating element. Actuation of the operating element moves a push rod 36 in the direction y1. The push rod 36 passes through bores 44 in projections 43 from the base/support 45 and in this manner is movably supported in the directions y1 and y2. The push rod 36 is in contact with the actuating element 19b. Movement of the push rod 36 in the direction y1 rotates the actuating element 19b in the direction v1 about the axis a3. Due to the movable connection via the coupler rod 37, movement of the actuating element 19b in the direction v1 also pivots the actuating element 19a about the pivot axis a2 in the direction v1.

Figure 10:
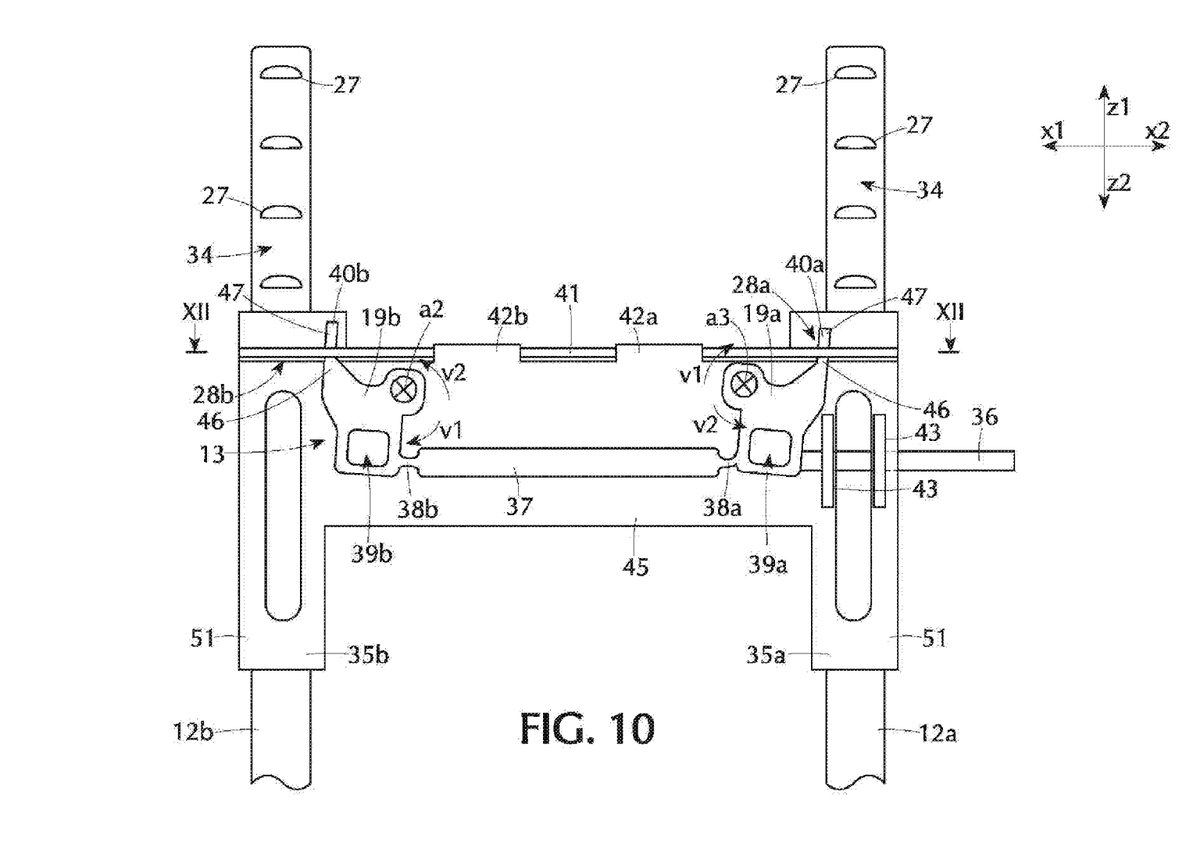
FIG. 10 is a view like FIG. 8 of the third embodiment in the unlatched position.
Figure 11:
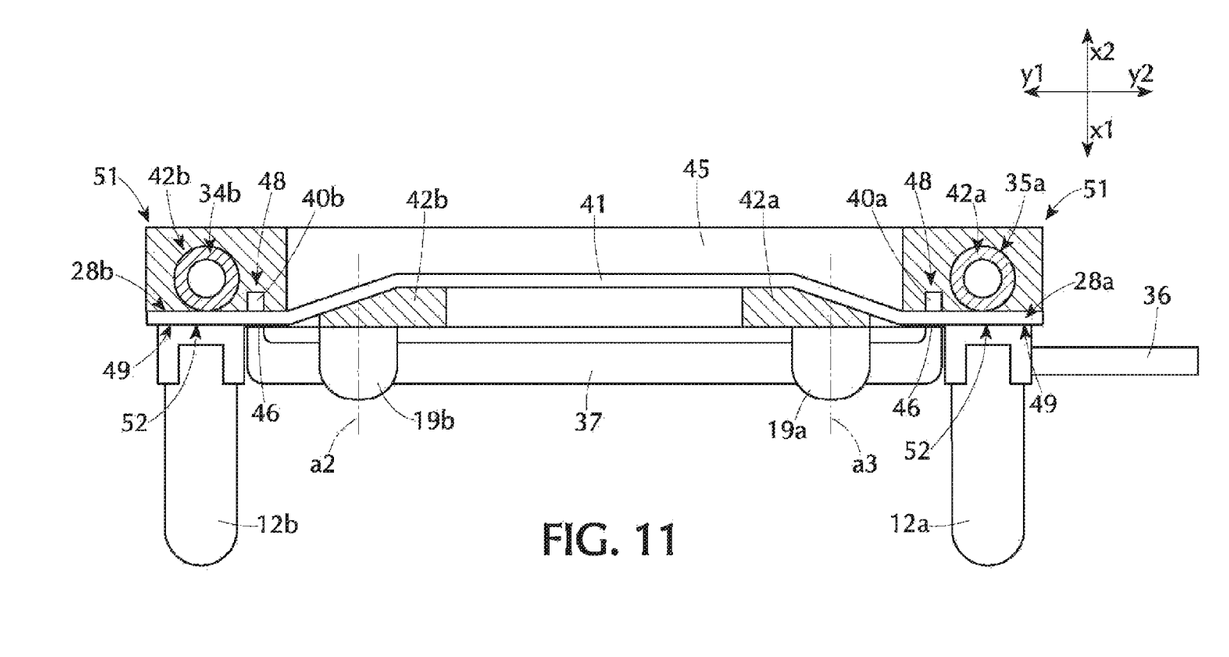
FIG. 11 is a section taken along line XI-XI of FIG. 8.
Figure 12:
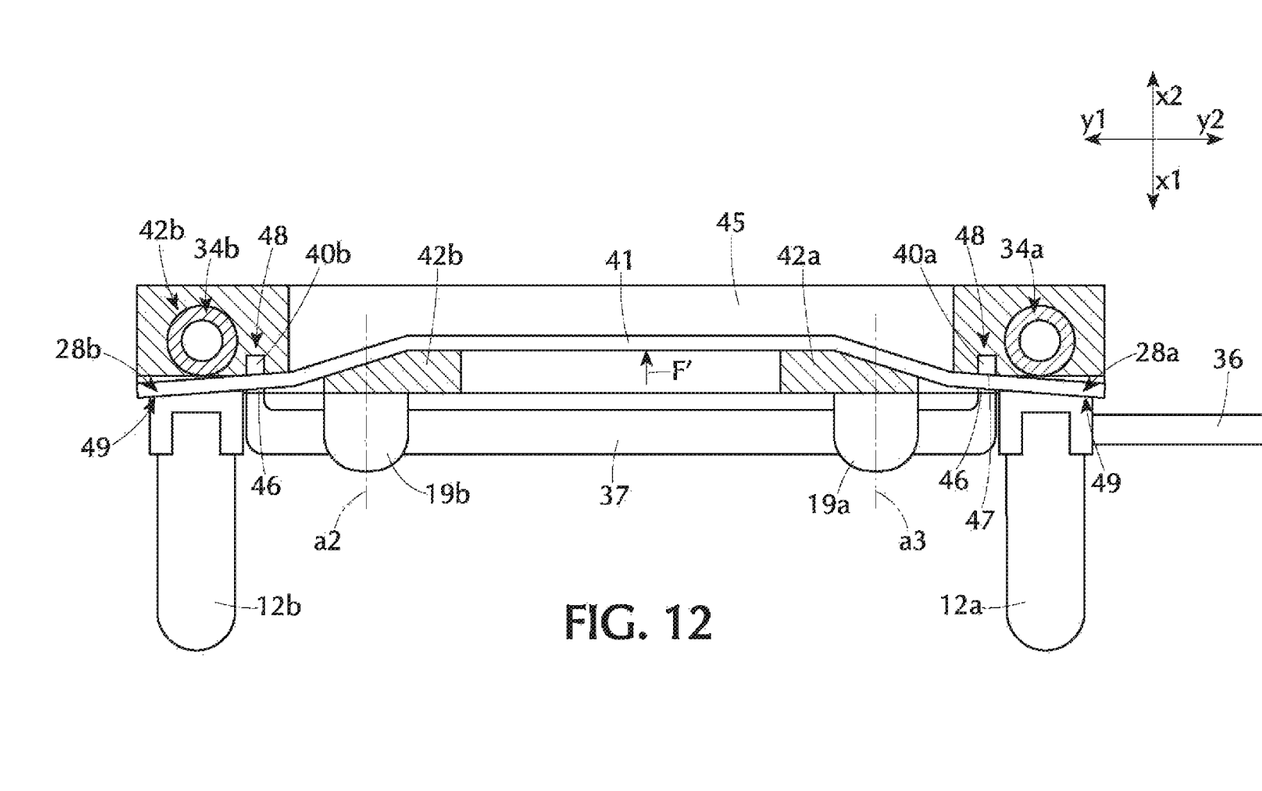
FIG. 12 is a section taken along line XII-XII of FIG. 10.

While the ends 28a and 28b of the spring 41 in the latched position of the latch 13 are seated in notches 50 of the actuating arms 40a and 40b (see, for example FIG. 8a), in the unlatched position the ends 28a and 28b engage angled surfaces 47 of the actuating elements 19a and 19b (see FIGS. 10 and 12).

The movement of the latch 13 into the unlatched position due to the actuating element 19a is described below.

Figure 8A:
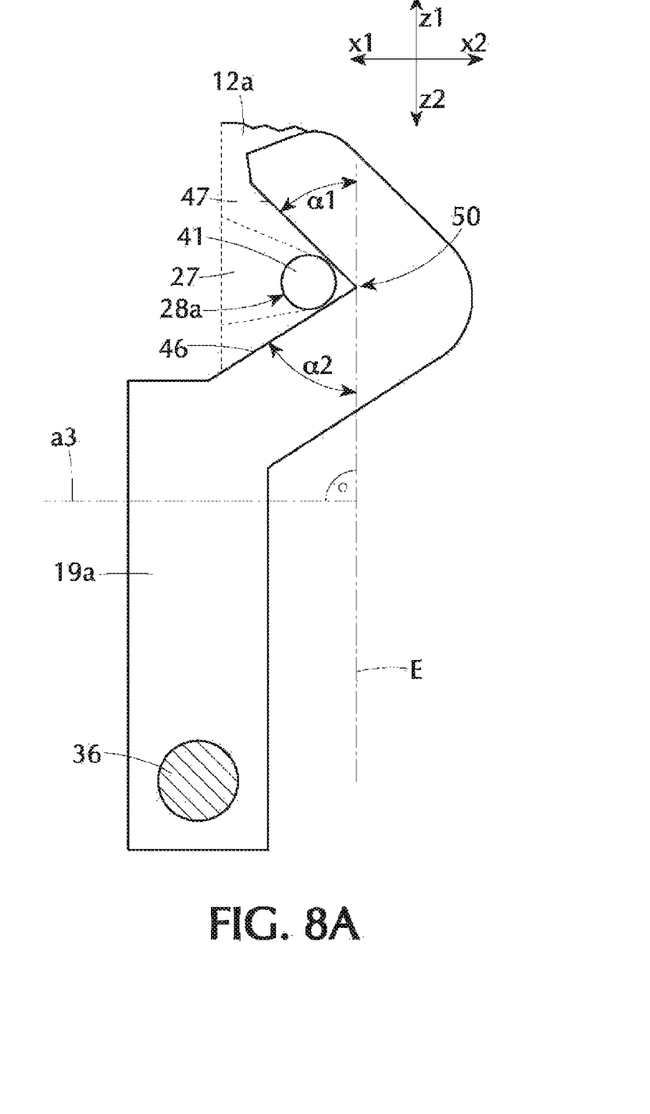
FIG. 8a is a section taken along line VIIIa-VIIIa of FIG. 8.
Figure 9:
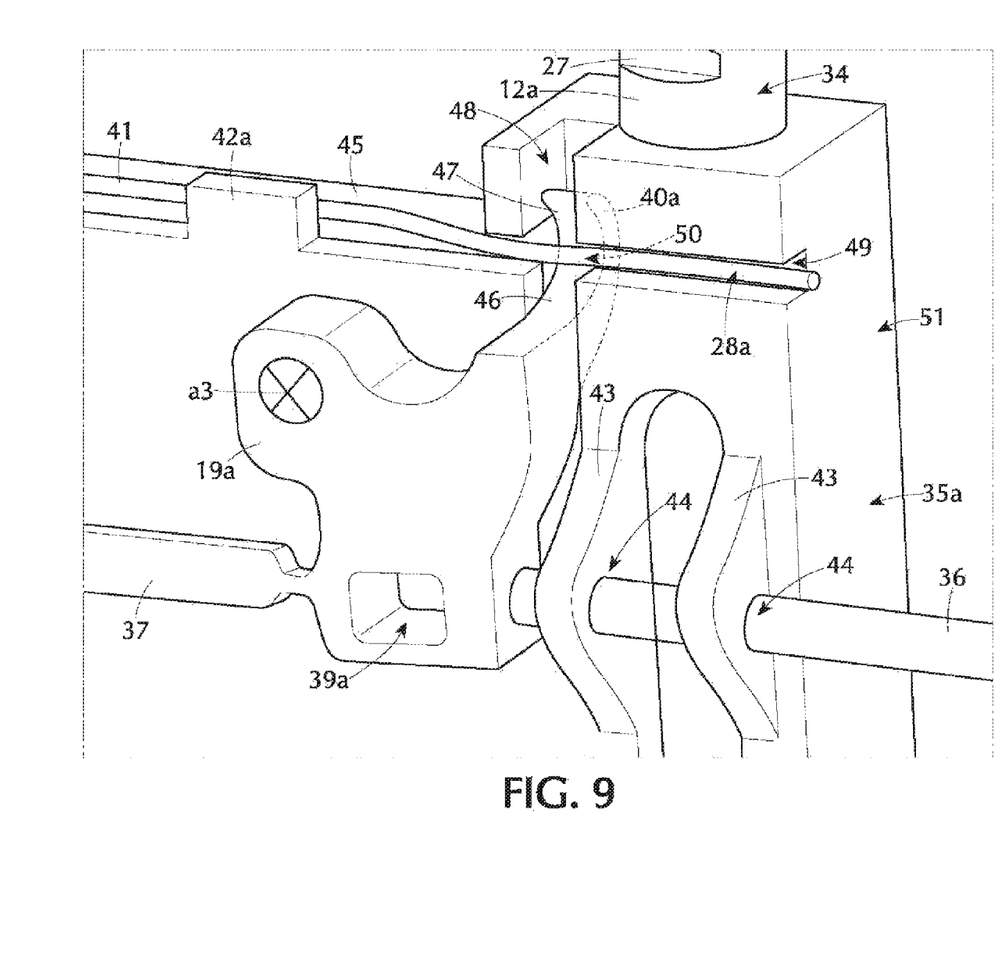
FIG. 9 is a section taken along line IX of FIG. 8.

In FIG. 8a, the latch is in the latched position, and the end 28a is engaged in the notch 27. The angled face 46 of the actuating elements 19a extends at an angle α2 to the plane E and the face 47 extends at an angle α1 to a plane E. In this embodiment, the angle α2 is the same size as the angle α1. Alternatively, the angle α2, however, could differ from the angle α1.

When the actuating element 19a is pivoted into the actuated position and the end 28a comes into contact with the angled face 47, a force therefore acts in the direction x1 on the end 28a and moves the end 28a in the direction x1 into the disengaged position.

The unlatching of the region 28b by the actuating element 19b occurs in the same manner. The function differs in the case of the actuating element 19b only in that the angled face 46 of the actuating arm 40b comes into contact with the end 28b and moves the end 28b in the direction x1 into the disengaged position.

As soon as the push rod 36 is no longer urged by the operating element (not shown) in the direction y1, the elastic return force of the spring element 41 causes the latch 13 to shift back into the latched position. The return force moves the ends 28a and 28b in the direction x2, and the actuating elements 19a and 19b are pivoted in the direction v2 out of the actuated position into the rest position until the ends 28a and 28b are in the notch region 50. As soon as the ends 28a and 28b engage in the notches 27, the head support 11 can no longer be moved in the directions z1 and z2.

It would also be possible to dispense with the actuating elements 19 and 19b and have a single actuating element act as shown schematically in FIG. 12 at F' on a center section between the seats 42a and 42b of the spring wire 41 serving as latch element to bow it such that the two ends 28a and 28b pull out of their notches 27.

We claim:

1. A headrest comprising:
a generally vertical rod mountable in a motor-vehicle seat and formed with a plurality of vertically spaced and horizontally open notches;
a support vertically movable along the rod and adapted to carry a head cushion;
a latch element carried on the support and shiftable between a latched position engaged in one of the notches and locking the support on the rod against downward movement and an unlatched position disengaged from the rod and permitting free vertical movement of the support on the rod; and
an actuating element pivotal about an axis on the support between an actuated position holding the latch element in the unlatched position and a rest position with the latch element in the latched position.

2. The headrest defined in claim 1, wherein the actuating element is a lever.

3. The headrest defined in claim 1, wherein the latch element is formed as a spring having one part engageable in the notches and another part fixed in the support.

4. The headrest defined in claim 1 wherein the latch element is a spring wire fixed in the support and having an end engageable in the notches and elastically deformable out of the notches.

5. The headrest defined in claim 1, wherein there are two of the rods extending parallel to each other, two of the latch elements each engageable with a respective one of the rods, and two of the actuating elements each engageable with a respective one of the latch elements.

6. The headrest defined in claim 5, further comprising a coupling member interconnecting the actuating elements for joint pivoting.

7. The headrest defined in claim 1, further comprising a control element movable linearly on the support and engageable with the actuating element to move same between the actuated and rest positions.

8. The headrest defined in claim 7, wherein the control element is pivotal or slidable on the support.

9. The headrest defined in claim 8, further comprising a motion converter between the control element and the actuating element for converting sliding or pivoting of the control element into pivoting of the actuating element.

10. A headrest comprising:
a generally vertical rod mountable in a motor-vehicle seat and formed with a plurality of vertically spaced and horizontally open notches;
a support vertically movable along the rod and adapted to carry a head cushion;
a latch element carried on the support and shiftable between a latched position engaged in one of the notches and locking the support on the rod against downward movement and an unlatched position disengaged from the rod and permitting free vertical movement of the support on the rod;
an actuating element pivotal about an axis on the support between an actuated position holding the latch element in the unlatched position and a rest position with the latch element in the latched position; and
a control element having a V-shaped notch with two flanks, the actuating element engaging centrally between the flanks in the notch in the respective rest position and being pressed into the actuated position by either of the flanks on displacement of the control element into a respective actuated position, whereby displacement of the control element in one direction brings one of the flanks into engagement with the actuating element and displacement in an opposite direction brings the other of the flanks into engagement with the actuating element.

11. A headrest comprising:
a pair of generally vertical and parallel rods mountable in a motor-vehicle seat and each formed with a plurality of vertically spaced and horizontally open notches;
a support vertically movable along the rods and adapted to carry a head cushion;
a spring having one part fixed to the support and a pair of other parts each engageable in the notches of a respective one of the rods, the other parts being shiftable between latched position engaged in respective ones of the notches and locking the support on the rod against downward movement and an unlatched positions disengaged from the respective rod and permitting free vertical movement of the support on the rod; and
two respective actuating elements engageable with the other spring parts and pivotal about an axis on the support between actuated positions holding the respective other spring parts in the respective unlatched positions and rest positions with the respective other spring parts in the latched positions.

12. The headrest defined in claim 11 wherein the one spring part fixed in the support is a center region of an elongated spring wire and the other spring parts engageable with the rods are outer opposite ends of the spring flanking the center region.

13. The headrest defined in claim 12, wherein the support has two spaced seats for the other parts of the spring wire and the actuating elements engage the spring wire between the seats.

* * * * *